April 13, 1926.
H. W. SELTZER
BRAZER
Filed Dec. 22, 1921    2 Sheets-Sheet 2
1,580,794
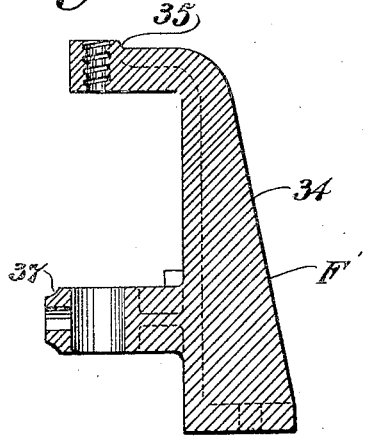
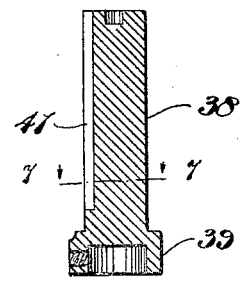
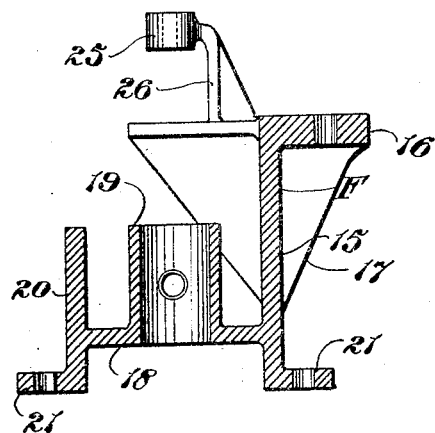
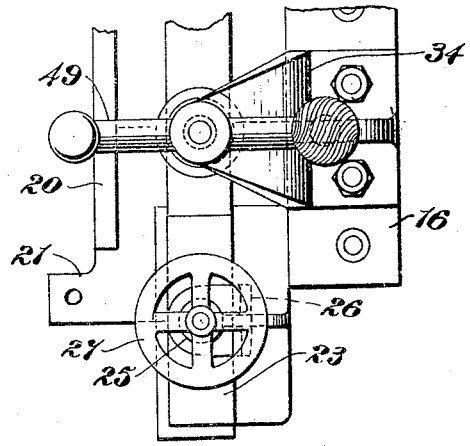
Inventor.
H. W. Seltzer.
by Hazard & Miller
Attys.

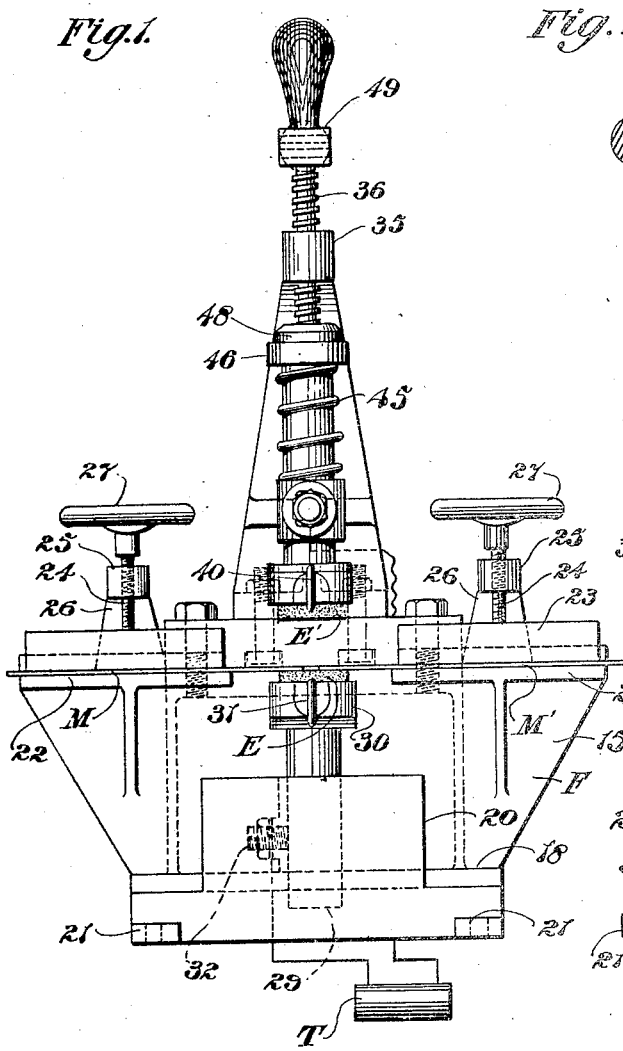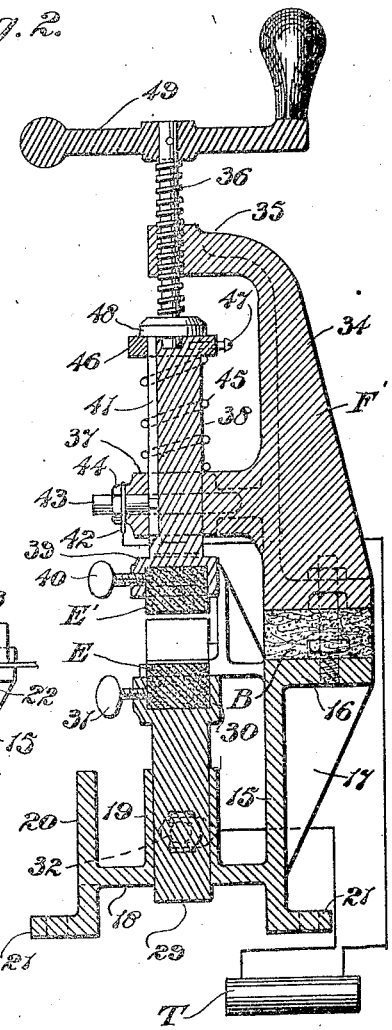

Patented Apr. 13, 1926.

1,580,794

UNITED STATES PATENT OFFICE.

HENRY W. SELTZER, OF SAWTELLE, CALIFORNIA.

BRAZER.

Application filed December 22, 1921. Serial No. 524,181.

*To all whom it may concern:*

Be it known that I, HENRY W. SELTZER, a citizen of the United States, residing at Sawtelle, in the county of Los Angeles and State of California, have invented new and useful Improvements in Brazers, of which the following is a specification.

My invention relates to electric apparatus for brazing, and a purpose of my invention is the provision of a brazing apparatus of extremely simple, durable and efficient construction which includes electrodes adapted to have direct contact with the metal to be brazed so that when current is supplied to the electrodes the heat generated by the current passing from one electrode to the other is utilized to melt a brazing compound, so that when the latter cools the two pieces of metal will be rigidly and securely connected.

I will describe one form of brazing apparatus embodying my invention and will then point out the novel features thereof in claims.

In the accompanying drawings,

Figure 1 is a view showing in front elevation one form of brazing apparatus embodying my invention.

Fig. 2 is a central vertical section of the brazing apparatus shown in Fig. 1.

Fig. 3 is a fragmentary top plan view of the apparatus shown in the preceding figures.

Fig. 4 is a central vertical sectional view of the lower frame comprised in the apparatus.

Fig. 5 is a central vertical sectional view of the upper frame.

Fig. 6 is a sectional view of the upper electrode carriage.

Fig. 7 is a transverse sectional view taken on the line 7—7 of Fig. 6.

Similar reference characters refer to similar parts in each of the several views.

Referring specifically to the drawings, my invention, in its present embodiment, comprises a lower frame designated generally at F and including a vertical wall 15 having its upper edge formed with a horizontally disposed ledge 16 braced by webs 17. At the forward side of the wall 15 is a horizontally disposed partititon 18 formed with a sleeve 19 and having its outer edge provided with a vertically disposed lip 20. The lower edge of the lip 20 and the wall 15 are provided with securing ears 21 through which suitable fastening members are adapted to extend for rigidly securing the frame as a unit upon a suitable base (not shown).

As clearly shown in Figs. 1 and 4, the frame F is provided at its forward side and at the upper edge of the wall 15 with tables or platforms 22, these platforms being designed to support the strips of metal to be brazed, and adapted to co-act with clamping blocks 23 movably supported on screws 24 threadedly fitted in sleeves 25 formed on the ends of brackets 26 formed integral with the table as clearly shown in Fig. 4. The upper ends of the screws 24 are provided with wheels 27 by means of which the screws may be rotated to move the blocks into or out of clamping engagement with respect to the tables 22. As clearly shown in Fig. 1, the tables 22 together with the blocks 23 are arranged in spaced relation to each other but in the same horizontal plane, the sleeve 19 being interposed between and beneath the tables and slidably receiving the shank 29 of a carriage for the lower electrode E. This carriage also includes a socket 30 which is adapted to receive the electrode E and to be locked therein by means of a set screw 31. The shank 29 is capable of being locked in any vertically adjusted position by means of a screw 32 (Fig. 1) threadedly fitted in the sleeve 19 and bearing against the shank in the manner shown.

The apparatus also includes an upper frame designated generally at F' and including a base plate 33 bolted or otherwise secured on a fiber block B sustained on ledge 16 in the manner clearly shown in Fig. 2. Rising upwardly from the plate 23 is a standard 34 having a horizontally disposed extremity 35 bored to threadedly receive a screw 36. As clearly shown in Fig. 5, the forward side of the standard 34 is provided with a sleeved extension 37 which slidably receives a shank 38 formed in the part of a carriage for an upper electrode E'. The carriage also includes a socket 39 in which electrode E' is adapted to be locked by a set screw 40. The shank 38 is provided with a keyway 41 in which slides a key 42 formed on the end of a screw-threaded shank 43 mounted in the sleeve 37 and adapted to be locked in proper position by means of a nut 44. By this arrangement it will be seen that rotation of the shank and consequently the electrode E' is prevented, while at the same time the shank is free to move vertically within the sleeve.

For normally urging the carriage upwardly so that the electrode E' will normally occupy a spaced position with respect to the electrode E, a coiled expansible spring 45 surrounds the shank 38 at a point between the sleeve 37 and an annular collar 46 secured to the upper end of the shank by means of a screw 47. A head 48 is rotatably fitted in the upper end of the shank 38 an is connected to the lower end of the screw 36 so that rotation of the screw can be effected without rotating the shank. The screw is adapted to be rotated by means of a crank 49, and by virtue of the threaded connection of the sleeve with the portion 35, it will be clear that vertical adjustment of the carriage and consequently the electrode E' can be readily effected.

In the operation of the apparatus, current is adapted to be supplied to the electrodes E and E' through a transformer designated at T with the terminals of the secondary connected to the screws 32 and 43, all as shown semi-diagrammatically in Figs. 1 and 2. The strips of metal to be brazed are indicated at M and M', and as shown in Fig. 1 are securely clamped on the tables 22 by means of the blocks 23 so that their confronting ends are secured in spaced relation to each other and in contacting relation with respect to the lower electrode E. By manipulation of the crank 49, the upper electrode E' can be moved downwardly into contacting relation with the ends of the two strips of metal M and M' so that when current is supplied to the electrodes, the heat thus generated will be conducted to the confronting ends of the metal strips and a brazing compound interposed therebetween thus rendering the latter fluid. It will be understood that when the brazing compound cools and thus hardens it will effect the rigid and secure connecting of the ends of the two strips, thereby completing the brazing process.

From the foregoing operation it will be clear that the apparatus set forth involves a method of electrically brazing two pieces of metal which consists substantially in arranging a pair of electrodes in contacting relation to and at opposite sides of pieces of metal whereby, when current is supplied to the electrodes the heat generated by the current traversing the electrodes will be conveyed to the pieces of metal for rendering a brazing compound interposed therebetween fluid.

Although I have herein shown and described only one form of brazing apparatus embodying my invention, it is to be understood that various changes and modifications may be made herein without departing from the spirit of the invention and the spirit and scope of the appended claims.

I claim as my invention:

1. A brazing apparatus comprising a lower frame and an upper frame insulated from the lower frame, a carriage adjustably mounted on the lower frame, an electrode sustained on the carriage, clamps on opposite sides of the carriage and sustained on the lower frame, a second carriage adjustable on the upper frame and including a shank, means for locking the shank against rotation, means for normally urging the shank upwardly on the frame, a socket on the lower end of the shank, an electrode removably sustained in said socket, and manually operable means carried by the upper frame and engageable with the shank for effecting longitudinal adjustment thereof against the action of said urging means.

2. A brazing apparatus comprising a lower frame and an upper frame insulated from the lower frame, a sleeve formed in the lower frame, a shank adjustably supported in the sleeve, a socket formed on one end of the shank, an electrode removably secured in said socket, an extension formed on the upper frame, a sleeve formed on the upper frame below said extension, a shank slidably fitted in the sleeve and having a groove formed therein, a key carried by the sleeve and engaging within said groove for preventing rotation of the shank, a socket formed on the lower end of the shank, a second electrode removably secured within said socket, a collar fixed to the upper end of the shank, a spring surrounding the shank between said sleeve and collar for normally urging the shank upwardly, a screw threadedly engaging said extension and rotatably associated with said shank, and a crank mounted on the screw for rotating the latter.

3. A brazing apparatus comprising aligned carriages supported for longitudinal adjustment and having their confronting ends formed with electrode receiving sockets, and means for locking the carriages against rotational movement.

In testimony whereof I have signed my name to this specification.

HENRY W. SELTZER.